April 21, 1959  NATSUO NARUMI  2,883,198
WORK DRIVER FOR THE METAL CUTTING MACHINE
Filed Sept. 18, 1956  3 Sheets-Sheet 1
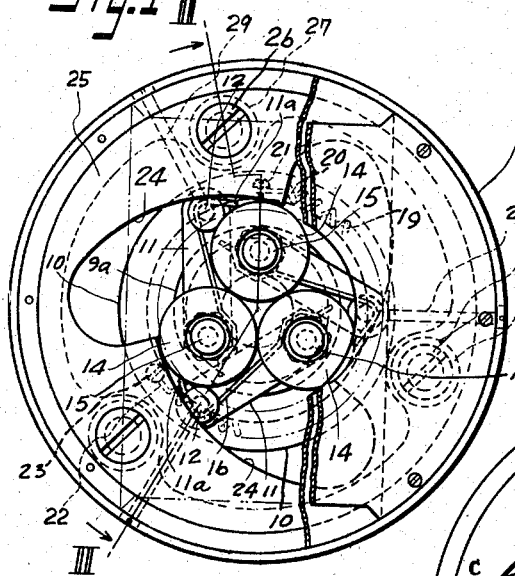
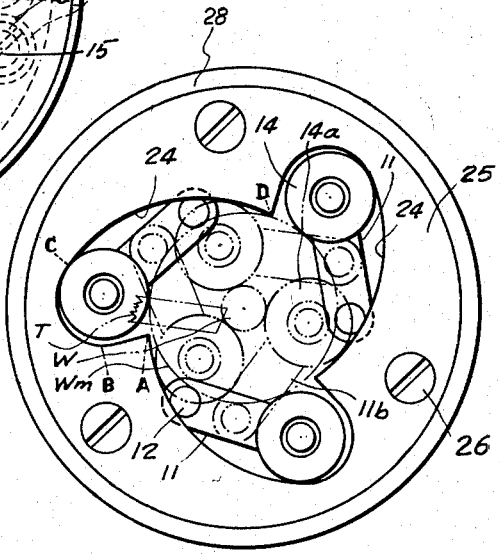
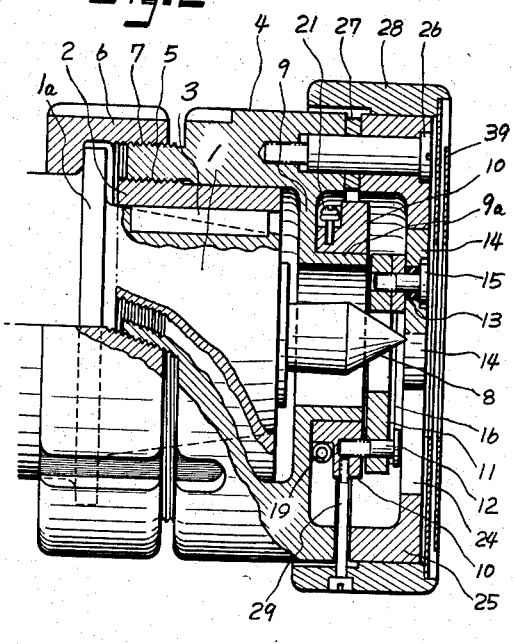
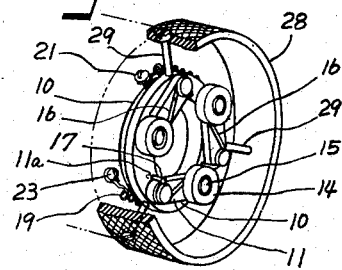

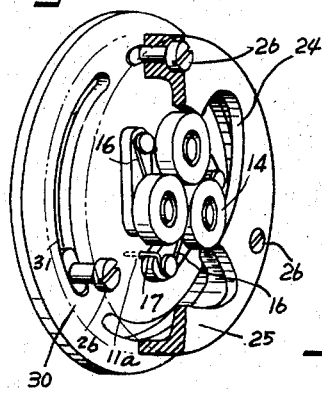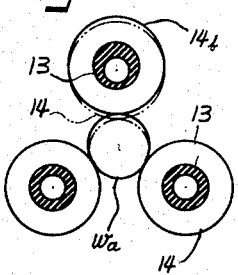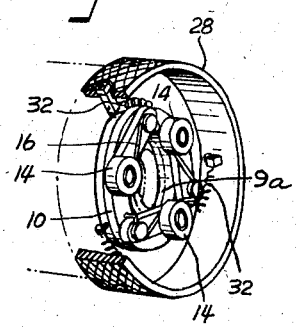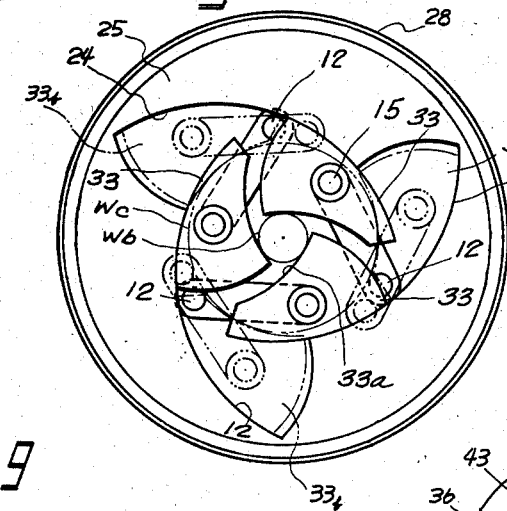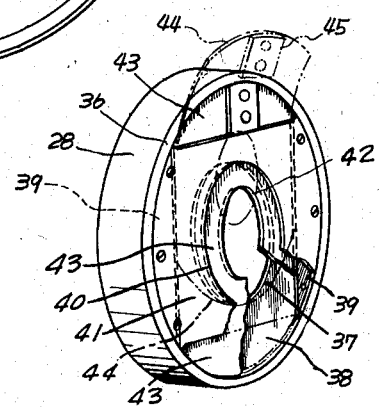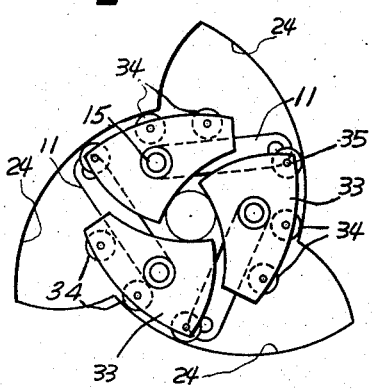

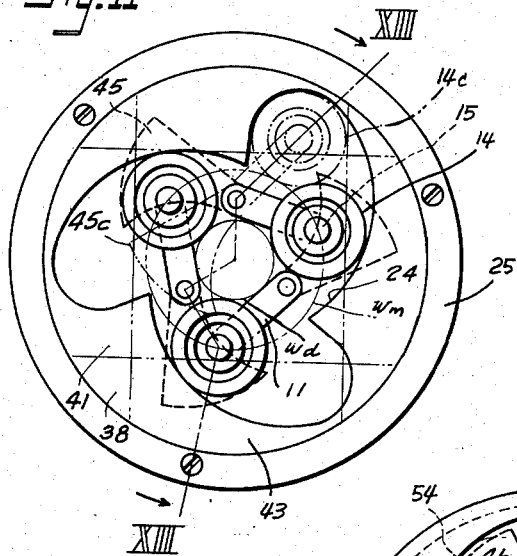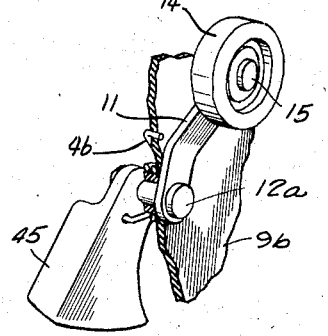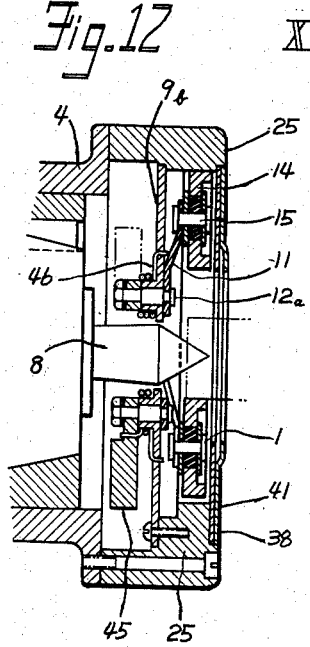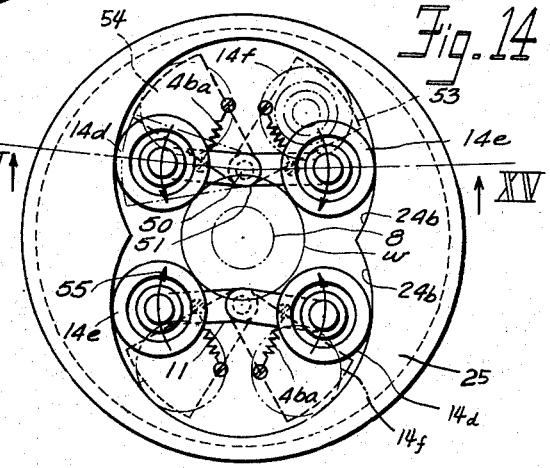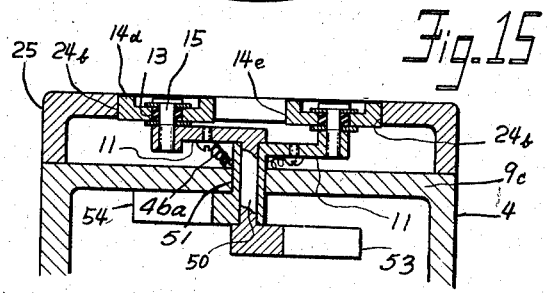

2,883,198
WORK DRIVER FOR THE METAL CUTTING MACHINE

Natsuo Narumi, Tokyo, Japan, assignor to Ikegai Iron Works, Ltd., Tokyo, Japan, a Japanese corporation Application September 18, 1956, Serial No. 610,577

3 Claims. (Cl. 279—33)

This invention relates to work drivers for metal cutting machines, lathes or other like machines.

In conventional drivers, there are many deficiencies which result in, for example, time losses for adjustments, danger of flying chips, and vibration due to lack of symmetry.

To avoid these situations, the invention contemplates providing an apparatus in which the holding members are movably pivoted on ends of arms which are pivoted on a turning member mounted on an adapter. The holding members can be moved along a flank of cam plate which is mounted in front of said adapter so that an article to be worked can be held firmly between the holding members and cam flank. Articles of various diameters can be held without difficulty.

In further accordance with this invention, counter-weights are mounted on the supporting arms of the holding members and, when the associated spindle begins to turn, said holding members are moved owing to the centrifugal force of the counter-weights and automatically hold the article.

Further objects, features and advantages of the invention will be apparent from the following descriptions.

In order that the invention may be more clearly understood, several forms thereof will next be described, by way of example, with reference to the accompanying drawings, in which:

Fig. 1 is a front elevational view, partially broken away, of one of the embodiments of the present invention;

Fig. 2 is a cross-sectional view taken on line II—II of Fig. 1;

Fig. 3 is an elevational front view of the flank of the cam and rollers of the structure in Fig. 1;

Fig. 4 is a fragmentary perspective view of the casing and the ring of the structure of Fig. 1;

Fig. 5 is a perspective view of a modification wherein one disk is used instead of said ring and bolts shown in Fig. 4;

Fig. 6 is a plan view of rollers employed in Fig. 5;

Fig. 7 is a fragmentary perspective view of a further modification;

Fig. 8 is a front elevation of another modification;

Fig. 9 is a front elevation of still another modification;

Fig. 10 is a perspective view of a detail;

Fig. 11 is a front elevation of another embodiment wherein centrifugal force is utilized;

Fig. 12 is a cross-sectional view taken on line XII—XII of Fig. 11;

Fig. 13 is a fragmentary perspective view of a portion of Fig. 12;

Fig. 14 is a front elevation of a further modification wherein a work driver is reversibly operated by way of centrifugal force; and Fig. 15 is a cross-sectional view taken on line XV—XV of Fig. 14.

As shown in Figs. 1 and 2, a sleeve 2 is secured to a spindle-nose 1 of a cutting machine by a key 3. A cylindrical adapter 4 of a work driver is attached on the outside of said sleeve 2 by a left handed screw thread 5 and the outside of said adapter 4 is locked by a right handed screw thread 7 on inner side of a box nut 6 which is mounted on a spindle 1 and engages with a flange 1a of said spindle 1. Adapter 4 is screwed on said sleeve 2 in a suitable relative position between the top of a center 8 and rollers 14, as described hereinafter, said relative position being adjusted by means of said left handed screw thread 5, and thus this apparatus may be fixed rigidly to the spindle-nose 1 through locking action by screwing said right handed screw thread 7 of the box nut 6 onto the outside of said adapter.

Inside of said adapter 4, an inner flange 9 is mounted around the end of said center 8 of the spindle 1, and a bushing 9a is pressed in or fixed on the flange 9. On the outer side of said bushing 9a is rotatably mounted a ring 10, on which a suitable number of arms 11 (Fig. 5) are pivoted on respective pins 12 of equal spacing. On the other end of each arm 11, rollers 14 are pivoted on pins 15 with or without elastic bushes 13. As shown in Figs. 4 and 5, one end 17 of springs 16 is respectively engaged in a hole 11a on the ring 10, the other end of each spring being respectively pressed against the side of pin 15 on the other end of arm 11, to press these rollers 14 outwardly against a flank 24 of cam plate 25, as described hereinafter. In order to rotate said ring 10 in a clockwise direction relative to said adapter 4, one end 20 of a spring 19 (Fig. 1) is secured by means of a set bolt 21 on the ring 10 and the other end 22 is fixed, and the spring tensioned, on the adapter 4 by means of a set bolt 23.

The said cam plate 25 formed with the flank 24 is fastened to said adapter 4 with spacers 27 and three reamer bolts 26. As shown in Fig. 3, the flank 24 is composed of a straight line portion A—B, and two adjacent arcuate portions B—C, and C—D and they form a simple curve formed by the same number of connected hooks as rollers. The recess formed with the said portions A—B and B—C is as large as the said rollers 14. The arcuate portion C—D is gradually curved to the center 8.

The casing 28 connected with the ring 10 by the bolts 29 covers outsides of both adapter 4 and cam plate 25 rotatably. As shown in Fig. 5, a disk 30, in which holes 31 for the reamer bolts 26 are formed, can be used instead of said ring 10 and bolts 29.

When an article or a work piece W is to be located, casing 28 should first be turned in counter-clockwise direction against the tension of the spring 19 and accordingly either of the bolts 29 and the ring 10 (Fig. 1) or the disk 30 (Fig. 5) is also turned together therewith, and thereby each arm 11 and roller 14 is opened as shown by full lines in Fig. 3 and are divergently moved away from the center 8. Therefore, with the casing 28 at that position, an article or a work piece W is inserted between the rollers and supported with two centers or center spindles S (the tail center is not shown). When the casing 28 is released, the ring 10 is turned in a clockwise direction with the casing by the tension of spring 19. As the spring 16 rotates the rollers 14 in a slight contact with the flank 24, the rollers are urged toward the center 8 and brought into contact with the article W as shown by dot and dash lines in Fig. 3, as indicated by 11b and 14a. When the spindle 1 is driven, said cam plate 25 and also the article W are turned with rollers 14.

When a tool T is brought into engagement with the article W, the article W is stopped briefly. Consequently the article W is turned a little in a clockwise direction. When the rollers 14 move into the wedge-shaped spaces which are formed between the flank 24 and the article W, the article W is wedged tightly and cannot come loose. The article of the possible largest diameter which can be handled is shown by Wm in Fig. 3.

If the center hole is always formed in an exact conformity with the center of the article, gaps or bushings 13 are not required between rollers 14 and pins 15. However, in case the center hole is set eccentrically or the outer surface of the article is irregular, it is advisable to provide the bushings 13 between rollers 14 and pins 15. As shown in Fig. 6, if the bushings 13 are available, each roller 14 may be irregularly positioned, and one of them is preferably moved to a position 14b so as to correct the non-uniformity of clamping power due to the eccentric center of the article Wa; thus, all of the rollers 14 and 14b can engage the article with equal pressure. The bushings 13 are preferably made of silicone rubber in order to prevent the corrosion of the bushings by oil.

Fig. 7 illustrates a modification of this invention, in which the gap between the ring 10 and bushing 9a is widened and the ring 10 and casing 28 are connected by springs 32 instead of said bolts 29 in order that the ring 10 can move freely.

In Fig. 8, a further embodiment is shown, in which wedge members or wedges 33 are used instead of said rollers. In this case, it is advantageous to form the wedges 33 so that an inner side 33a of the wedges 33 is of substantially equal diametral arc to the largest article which this apparatus is able to hold.

In this modification, constructions and operations of other parts are almost the same as hithertofore mentioned embodiments with rollers, except that the rollers rotate on the flank 24, whereas the wedges 33 slide on the said flank.

That is to say, in Fig. 8, the wedges 33 are able to hold the article Wb at a position shown by full line or are able to hold a larger article Wc when the wedges 33b are open as shown by dot and dash line. Moreover, in the embodiments with rollers, the rollers 14 are in line contact with the article W and flank 24 and the pressure acting upon the article is rather high, but in the latter embodiment with wedges, the pressure is lower.

In Fig. 9, wheels 34 are pivoted on the sliding surface of the wedges 33 by pins 35, so that the sliding engagement with the flank 24 is decreased.

As shown in Fig. 10, a slight circular projection 36 is provided in front of the casing 28 in order to protect the inner construction from injury by chips. A circular metallic sheet cover 38 having a round hole 37 in its center, two sheets 39 for both the right and left sides and cover or shield member 41, of which the upper and lower ends are removed and in which a hole 40 is provided in the center, are fixed inside of said projection 36 to make a space between cover 38 and shield member 41. In order to comply with the working of the various articles having different diameters, several fiber shields 43 formed respectively with different sizes of holes 42 in its center are respectively provided, and in accordance with the diameter of the articles, the desired shield is changeably inserted in said space between covers 38 and 41. In this case, both arcuate ends 44 of the shield 43 engage with the inner surface of the projection 36. Therefore the shield can never fly out by centrifugal force, and moreover, for convenience, a flange 45 is provided at one end of the shield 43.

The inner construction of the device is protected from injury by chips by the insertion of a suitable shield 43 in said space and the life of the device is prolonged.

Figs. 11 to 13 illustrate another embodiment of this invention, in which in front of the said adapter 4 is clamped a cam plate 25, inside of which a projection or flange 9b is fixed. Near the center 8 are pivoted, at equal distances and by pins 12a, three arms 11 on the ends of which the rollers 14 are pivoted. Counter-weights 45 are fixed to the internal ends of the pins 12a and extend in a direction opposite to that of said arms 11. Moreover, springs 46 are interposed between a moving portion (i.e. counter-weight 45) and a fixed portion (i.e. flange 9b so that when the arms or the counter-weights and the spindle are stopped, the arms 11 and the rollers 14 are in a distant position 14c from the center 8 and the counter-weights 45 are in a position 45c near the center 45c.

Therefore, when the spindle is turned, in a counter-clockwise direction, the counter-weights 45 are moved away from the center 8 by centrifugal force and the arms 11 are moved on toward the center 8. As the rollers 14 roll on the flank 24, these rollers 14 are caught between article Wd and flank 24, and thereby the article is automatically held in a firm state as described above.

When the spindle 8 is stopped, centrifugal force disappears, and as the result, the arms 11 are caused to open by the tensions of the springs 46, so that the article is capable of being taken out easily.

In this embodiment, wedges may also be used instead of the rollers.

Figs. 14 and 15 illustrate a further modification of this invention. An inner flange 9c is formed integrally with inner side of the adapter 4, and two shafts, namely a solid shaft 50 and a hollow shaft 51, are pivoted concentrically at both sides of the center 8 on said flange 9c and counter-weights 53 and 54 are respectively fixed at the inner side of said flange 9c to said shafts 50 and 51. Arms 11 are respectively fixed to the outside of the shafts, and at the end of said arms 11, rollers 14d and 14e are pivoted loosely by pins 15 by means of the bushings 13. Moreover, one end of the springs 46a is respectively attached to an arm 11, and the other end is secured to the inner flange 9c as shown in Fig. 14.

In front of the adapter 4, a cam plate 25 is likewise provided with a flank 24b which is substantially formed as a figure 8, and said rollers 14d and 14e are always caused to contact flank 24b.

Therefore, when the center spindle 8 is stopped, the rollers 14d and 14e stand away from the center 8 due to the tension of springs 46a, as shown in Fig. 14 by dot and dash line 14f and the counter-weights 53 and 54 are near the center 8, so that the article W may easily be attached to the center 8.

When the spindle 8 turns in a counterclockwise direction, the counter-weights 53 and 54 are respectively moved against the tension of springs 46a by centrifugal force in the direction as shown by arrows 55 and the rollers 14d and 14e are respectively turned on the flank 24b and moved to the center 8 and slightly touch the article W and the flank 24b. When a tool is brought into engagement with the article W, the article is relatively turned by the tool and thereby the rollers 14e are rotated and caught in fast between the article W and flank 24b, and the article W is firmly held by the rollers 14e and at the same time other two rollers 14d touch only slightly with the article but do not take part in holding the same.

Even when the spindle 8 begins to turn in the reverse direction, namely in a clockwise direction, the article is held only by the other rollers 14d, and the rollers 14e do not operate.

As the rollers 14d and 14e comprise respectively a central slit, an eccentric article may also be held by the center 8. When the spindle is stopped, due to disappearance of centrifugal force, each of the rollers is automatically moved back to its original position by the tension of spring 46a, and the article W may easily be taken out. In this embodiment, said wedges may, of course, be used instead of the rollers.

What I claim is:

1. A work driver comprising an adapter, an inner cam plate on the adapter and having an open center defined by inwardly curved flanks connected and converging toward the center of the plate but eccentrically thereof, lever arms for each of said flanks, and work holding members including movable holders pivotally mounted and facing each flank so as to wedge between an article to be worked and said flanks.

2. A work driver comprising an adapter, a cam plate on the adapter and having an open center defined by inwardly curved connected flanks converging toward the center of the plate but eccentrically thereof, lever arms for each of the flanks, a turning member pivotally supporting the lever arms and supported on said adapter, and work holding members including movable holders pivotally mounted so as to face said flanks upon said lever arms so as to wedge between an article to be worked and said flanks.

3. A work driver comprising an adapter, a cam plate on the adapter and having an open center defined by inwardly curved connected flanks converging toward the center of the plate but eccentrically thereof, lever arms for the flanks pivotally mounted on said adapter, counter weights operatively associated with the lever arms, and work holding members including movable holders and pivotally mounted facing said flanks upon the lever arms so as to wedge between an article to be worked and said flanks.

References Cited in the file of this patent

UNITED STATES PATENTS

| | | |
|---|---|---|
| 749,794 | Inman | Jan. 19, 1904 |
| 1,149,148 | Miller | Aug. 3, 1915 |
| 1,770,515 | Godfriaux | July 15, 1930 |
| 2,207,230 | Stoner | July 9, 1940 |
| 2,479,560 | Eaton | Aug. 23, 1949 |
| 2,493,995 | Nowka | Jan. 10, 1950 |
| 2,779,187 | Stewart | Jan. 29, 1957 |